United States Patent [19]
Gutshall

[11] 3,854,372
[45] Dec. 17, 1974

[54] SCREW ADAPTED FOR VISIBLE INSPECTION OF TIGHTNESS

[75] Inventor: Charles E. Gutshall, Rockford, Ill.

[73] Assignee: Elco Industries, Inc., Rockford, Ill.

[22] Filed: Oct. 20, 1972

[21] Appl. No.: 299,347

[52] U.S. Cl.............................. 85/61, 85/62
[51] Int. Cl................................. F16b 31/02
[58] Field of Search......... 85/62, 61, 45, 32 R, 9 R; 151/21 C

[56] References Cited
UNITED STATES PATENTS

| | | | |
|---|---|---|---|
| 2,685,812 | 8/1954 | Dmitroff | 85/61 |
| 3,285,119 | 11/1966 | Dean et al. | 85/61 |

FOREIGN PATENTS OR APPLICATIONS

| | | | |
|---|---|---|---|
| 660,630 | 4/1963 | Canada | 85/61 |

Primary Examiner—Ramon S. Britts
Attorney, Agent, or Firm—Wolfe, Hubbard, Leydig, Voit & Osann, Ltd.

[57] ABSTRACT

A screw having an elongated threaded shank includes a head integrally formed on the upper end of the shank. Corner portions of the head are weakened to a predetermined strength correlated with a predetermined torque to which the screw may be tightened into a workpiece by a tool engaging the weakened corner portions. As the screw is threaded into the workpiece by the tool, the weakened corner portions are folded along sides of the head when the tightening torque applied to the screw exceeds the predetermined torque. The folded corner portions thus provide visual evidence that the screw is tightened properly in the workpiece.

37 Claims, 20 Drawing Figures

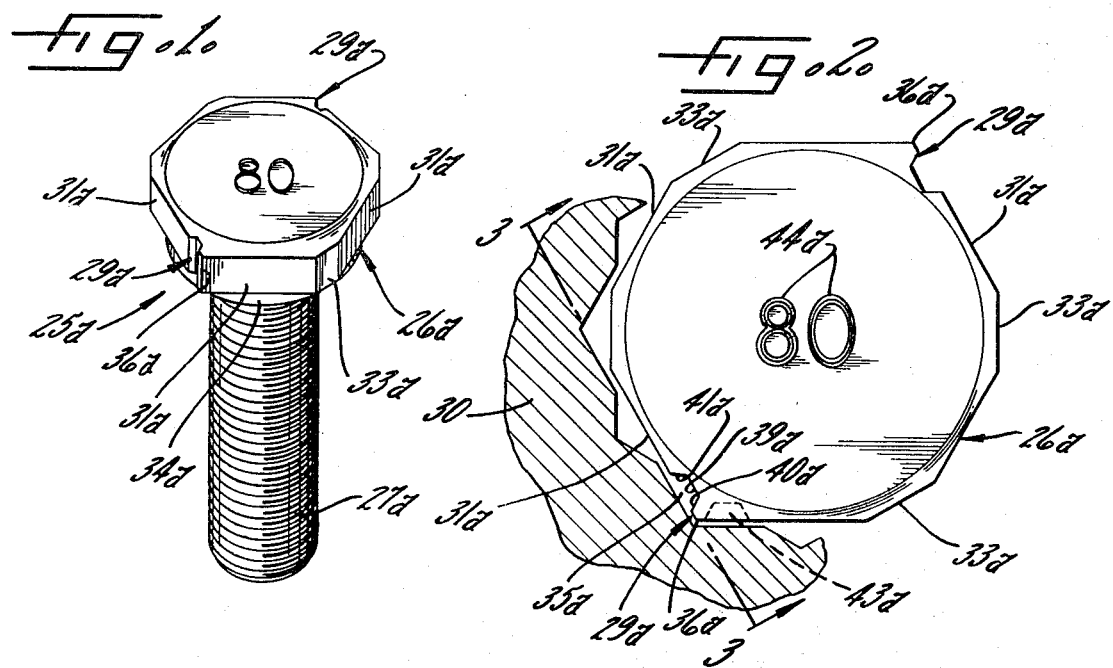
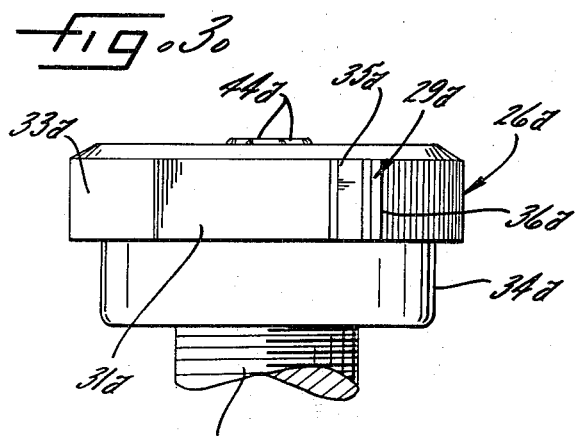
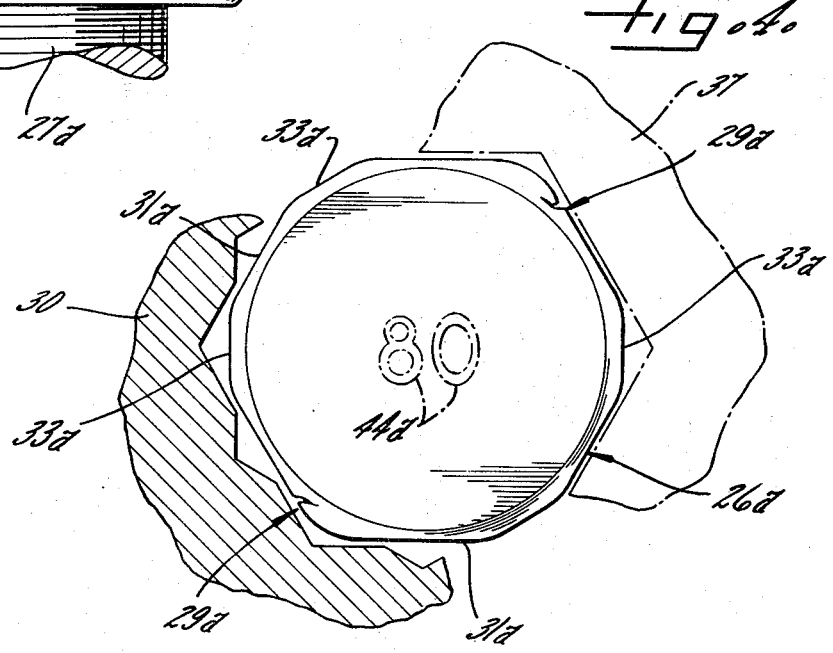

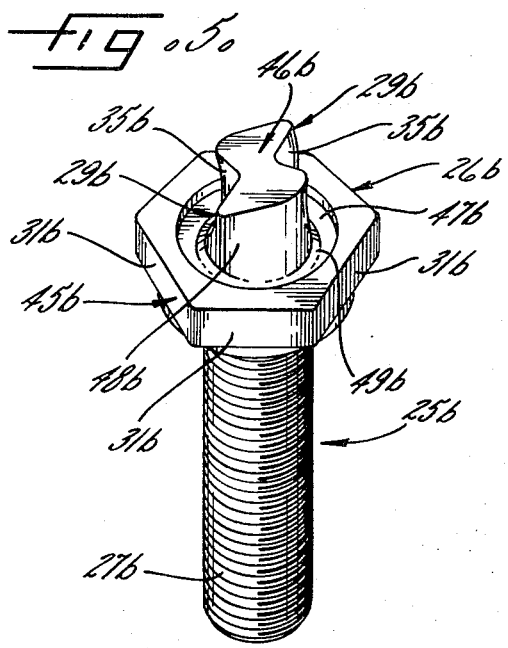
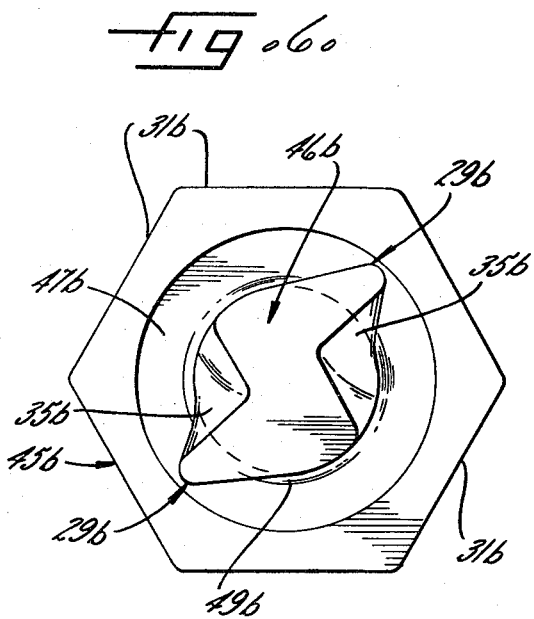
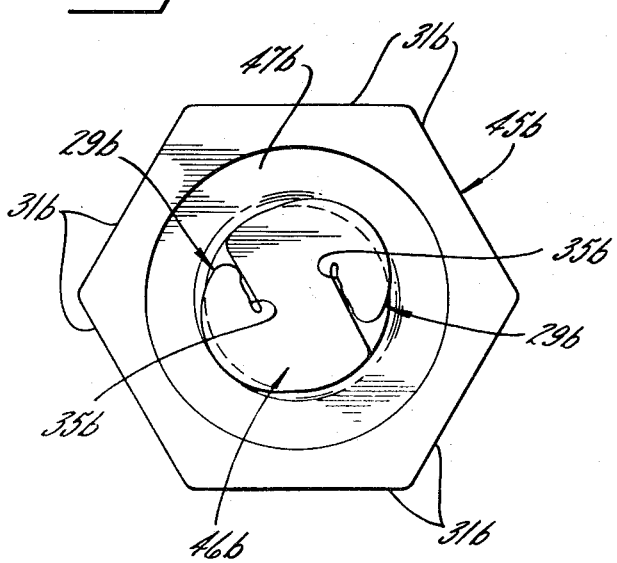
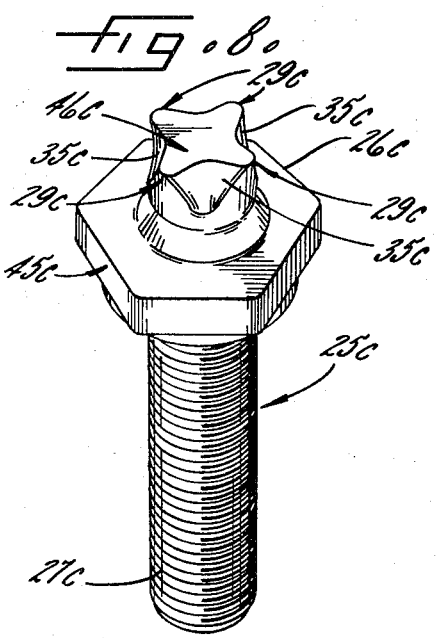

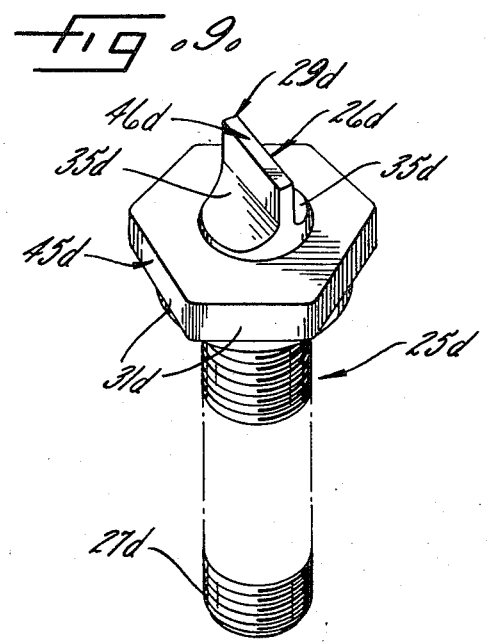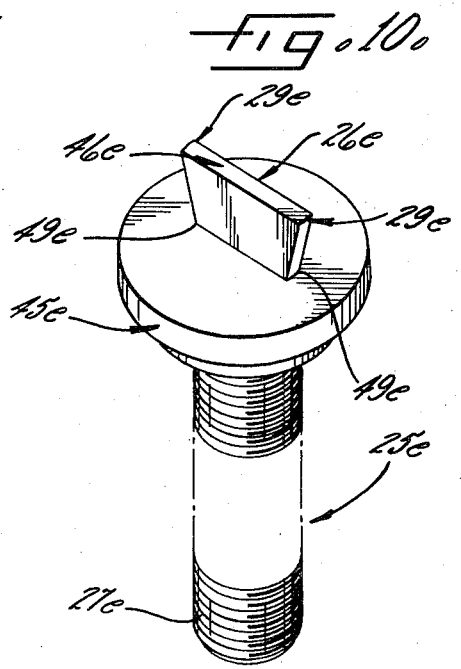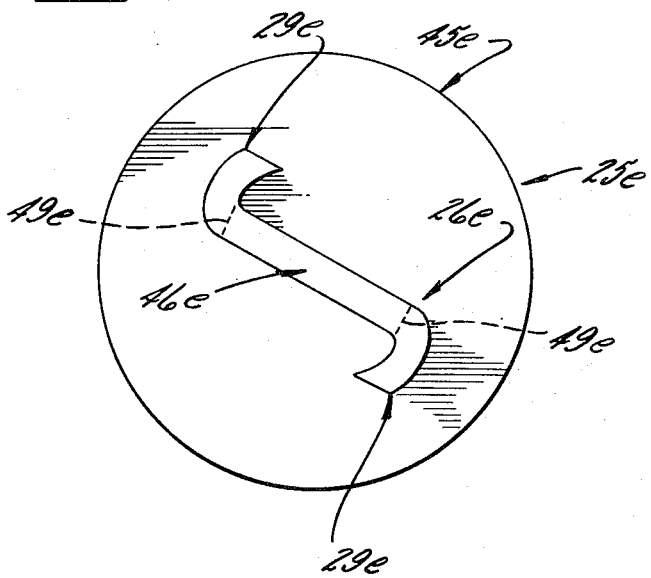

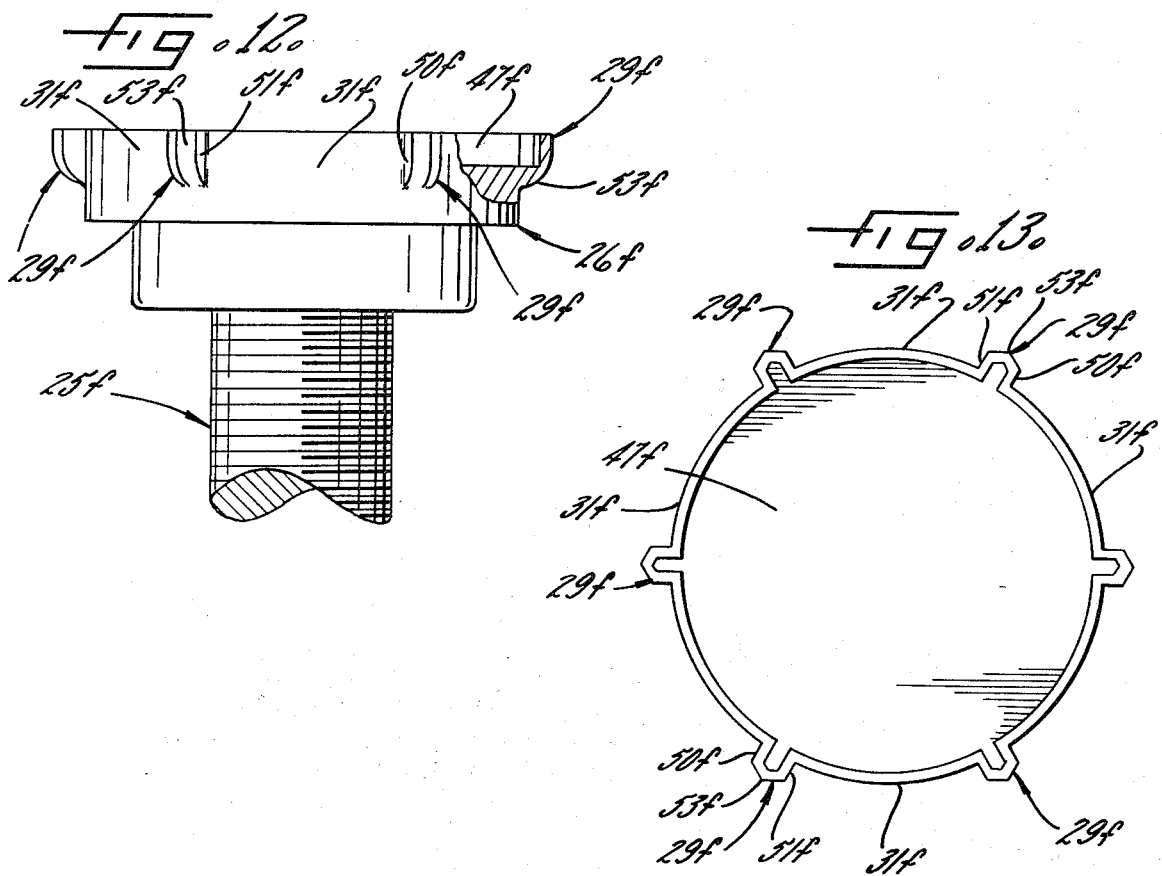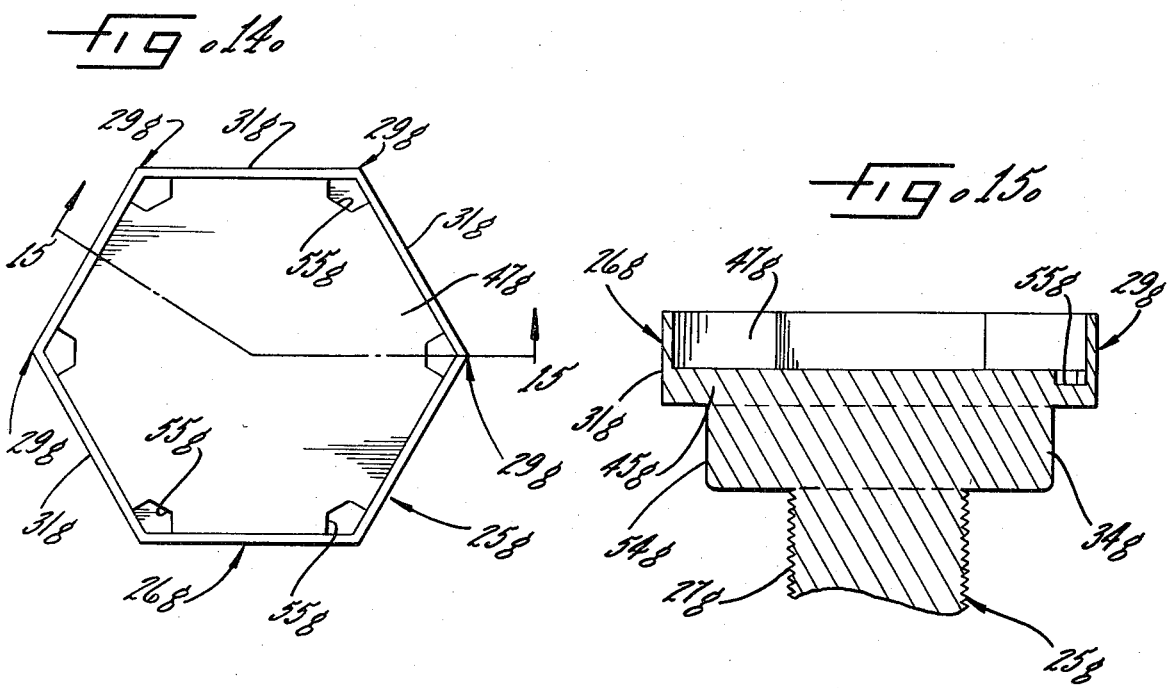

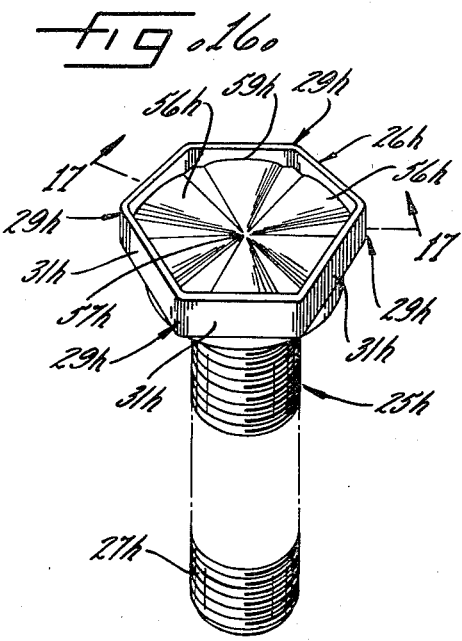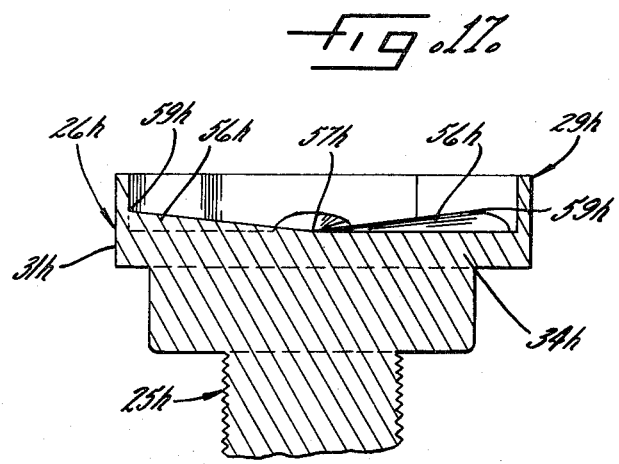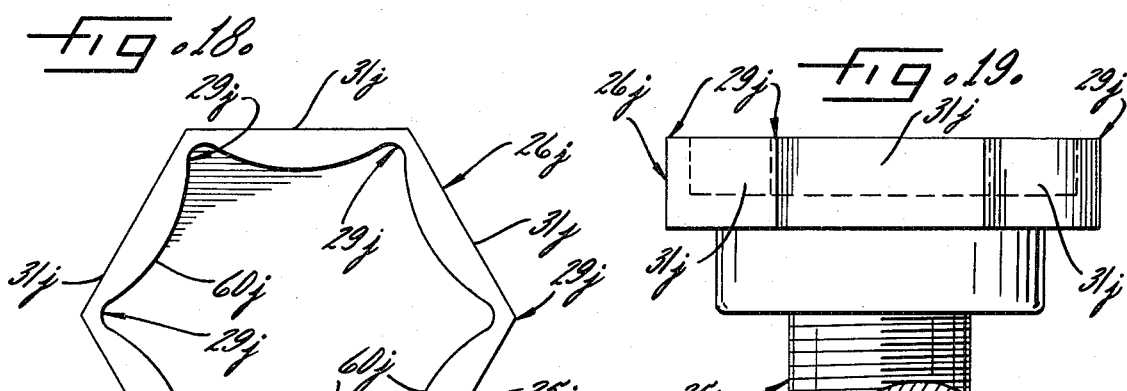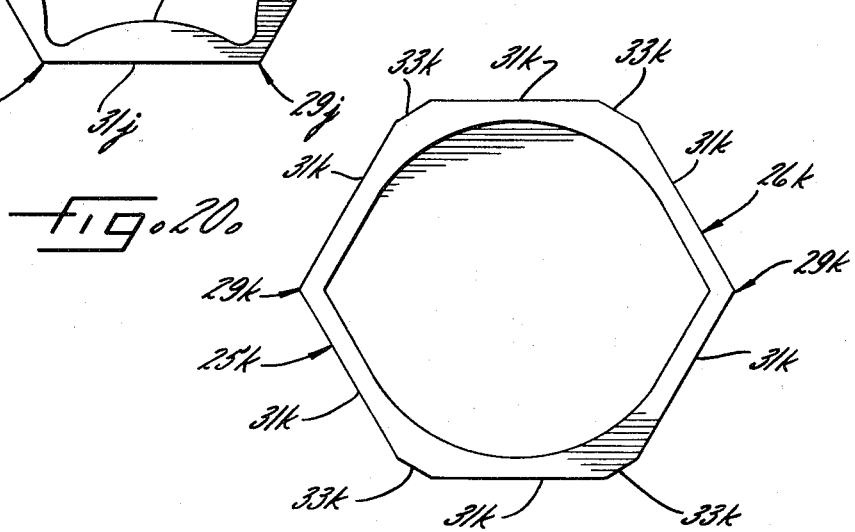

SCREW ADAPTED FOR VISIBLE INSPECTION OF TIGHTNESS

BACKGROUND OF THE INVENTION

The present invention relates generally to screws and, more particularly, to screws adapted to indicate visibly when they have been tightened to a predetermined torque to assure that the screws have been tightened properly. Examples of screws of the foregoing type are disclosed in U.S. Pat. Nos. 3,449,998, 3,498,174 and 3,194,105.

SUMMARY OF THE INVENTION

The primary object of the present invention is to provide a new and improved screw of the above described character which is easier to use in assembly line production and is easier to check for proper tightness than the prior screws. A more detailed object is to accomplish the foregoing by weakening portions of the head of the screw so that, as the screw is tightened with a tool, the weakened portions give way deforming the head and thereby serve as indicators which may be checked either visually or by touch to assure that the screw has been tightened properly, the deformation also causing the tool to slip to prevent excessive tightening of the screw with the same tool and this without portions of the head being broken loose from the screw.

An additional object is to provide the head of the screw with a novel shape so the screw can be loosened or retightened with a second tool if necessary. More particularly, provision is made so the shape of the head is suitable for use with usual tools, the head having a generally hexagonal shape with the weakened portions formed at the corners thereof to enable a conventional double hexagonal socket of a predetermined size to be used initially to tighten the screw prior to the corners giving way and, thereafter, to enable a single hexagonal socket of the same size to be used to loosen or retighten the screw.

The invention also resides in the unique formation of the weakened portions of the head to control the amount of torque required to deform the head such as by the portions being twisted or bent relative to the sides of the head with the initial tightening tool and in the novel construction of the head with areas such as recesses or notches to receive the material bent from the weakened portions so the head is relatively smooth to the touch after the screw is tightened properly. Still further, the invention resides in the provision of the screw with a dark finish to contrast with the deformed portions which are shined by the tool thus making the deformed portions easier to see when checking for tightness.

These and other objects and advantages of the present invention will become more apparent from the following detailed description when taken in conjunction with the accompanying drawings.

BRIEF DESCRIPTION OF THE DRAWINGS

FIG. 1 is a perspective view of one form of a screw embodying the novel features of the present invention.

FIG. 2 is an enlarged plan view of the screw shown in FIG. 1.

FIG. 3 is an enlarged fragmentary elevational view taken substantially along line 3—3 of FIG. 2.

FIG. 4 is a view similar to FIG. 2 but showing portions of the screw deformed by a tool.

FIG. 5 is a perspective view of an alternate embodiment of the present invention.

FIG. 6 is an enlarged plan view of the embodiment shown in FIG. 5.

FIG. 7 is a view similar to FIG. 6 showing portions of the screw deformed.

FIGS. 8, 9 and 10 are perspective views of modified forms of the embodiment shown in FIG. 5.

FIG. 11 is an enlarged plan view of the modified embodiment of FIG. 10 showing portions of the screw deformed.

FIG. 12 is a fragmentary elevation view of another alternate embodiment of the present invention.

FIG. 13 is an enlarged plan view of the screw shown in FIG. 12.

FIG. 14 is a plan view of still another alternate embodiment of the present invention.

FIG. 15 is a fragmentary cross-sectional view taken substantially along line 15—15 of FIG. 14.

FIG. 16 is a perspective view of a modified form of the embodiment shown in FIGS. 14 and 15.

FIG. 17 is an enlarged fragmentary cross-sectional view taken substantially along line 17—17 of FIG. 16.

FIG. 18 is a plan view of another modified form of the embodiment shown in FIG. 14.

FIG. 19 is a fragmentary elevational view of the screw shown in FIG. 18.

FIG. 20 is a plan view of still another modified form of the embodiment shown in FIG. 14.

DETAILED DESCRIPTION OF THE PREFERRED EMBODIMENTS

As shown in the drawings for purposes of illustration, the present invention is embodied in a screw 25 particularly adapted for use in assembly line production such as in the automotive industry so that when threaded into a workpiece (not shown) to a predetermined torque the screw is deformed visibly to indicate that it is tightened properly. This deformation then serves as visual evidence which thereafter may be checked to make sure that the screw in fact is tightened properly into the workpiece and performing its intended holding function.

In accordance with the primary aspect of the present invention, the screw 25 includes a novel head 26 enabling the screw to be checked visually for proper tightness more easily and quickly than is possible with prior similar screws. For these purposes, the head is formed integrally on the end of a threaded shank 27 and includes weakened portions 29 each of a predetermined strength correlated with the predetermined torque to which the screw is to be tightened in the workpiece. The weakened portions are adapted for engagement by an initial tightening tool 30 for threading the screw into the workpiece but give way bending relative to the head without breaking loose as the screw is tightened to the predetermined torque. Once the weakened portions give way, the tool then slips around the head and thus is kept from being used to tighten the screw excessively and, advantageously, the deformed weakened portions also provide clear visual evidence that the screw is tightened properly.

In the present instance, one form of the invention is shown in FIGS. 1 through 4 wherein parts of the screw 25 are identified by numbers each with the same appended letter. Similarly, corresponding parts of other embodiments are identified by the same numbers, but with different appended letters so that the associated parts comprising each individual embodiment are readily identifiable. In the instant embodiment, the head 26a of the screw 25a is shaped generally as a hexagon and includes vertical sides 31a and four vertical flats 33a, which may be arcuate, extending between adjacent sides. The flats thus round off four of the corner portions of the head while the weakened portions 29a form the two remaining corner portions of the head. An annular shoulder 34a serves as the base of the head to engage with the workpiece and is spaced inwardly of the sides of the head to enable the tightening tool to engage the weakened corners along their full heights. Controlling the predetermined strength of each of the weakened corner portions is the thickness of the head as weakened by a vertical notch 35 a of predetermined size which is formed in the side of the head and adjacent an edge 36a of each weakened corner portion.

In use, the weakened corner portions 29a are engaged by the tool 30 to tighten the screw 25a in the workpiece. Advantageously, the tool used to tighten the screw may be one of conventional construction such as twelve-point or double hexagonal driver 30. When tightening the screw with this type driver, the force used to tighten the screw is applied only to the weakened corner portions and, when the screw is tightened to its predetermined torque, the portions collapse being folded over and smoothed into the notches 35a by the driver (see FIG. 4) without breaking off the head 26a. Thereafter, because the other corner portions of the screw are rounded by the flats 33a the driver readily slips around the head whereby the screw is kept from being tightened further. The sides 31a of the head, however, remain undamaged so that a second tool 37 such as a conventional single hexagonal driver which is the same size as the double hexagonal driver may be used to loosen and retighten the screw. This is because the tightening force applied to the screw by the single hexagonal driver 37 is transmitted through the sides of the head rather than through the corners previously rounded by the double hexagonal driver 30. Thus, one conventional driver 30 of a certain size designation may be used to tighten the screw while another conventional driver 37 of the same size designation may be used to loosen and retighten the screw if such should become necessary. Moreover, by virtue of the corners being folded over into the notches and thereby rounding off the otherwise sharp corner portions 29a of the head, the folded corners provide readily visible evidence that the screw in fact has been tightened to its proper torque. In addition, proper tightness of the screw may be checked by feeling the screw for smoothness to determine if the corners have been folded into the notches.

In the instant embodiment, the two weakened corner portions 29a are positioned diametrically of each other. The notches 35a, which are virtually identical to each other, are located in the sides 31a of the head 26a in the same relative positions with respect to the edges 36a of their associated corner portions. Accordingly, only one of the notches will be described in detail, it being appreciated that the description applies equally well to the other notch.

As best shown in FIG. 2, the notch 35a is formed with a cross-sectional area which is generally trapezoidal in shape but virtually any generally U-shaped notch such as one having a triangular or a semi-circular cross section may be used for the purposes of the present invention. In the right-hand threaded screw illustrated, the notch is positioned forwardly of its corner in a clockwise direction and includes an inner wall 39 and opposite end walls 40a and 41a. The inner wall is spaced inwardly of and extends generally parallel to the side 31a of the head and one of the end walls 40a of the notch is located adjacent the edge 36a extending inwardly generally in a radial direction to join with one end of the inner wall. The other wall 41a also extends inwardly but converges toward the end wall 40a upon progressing inwardly from the side 31a and eventually joins with the other end of the inner wall 39a. It will be appreciated that in a left-hand threaded screw similar to the foregoing type screw, the notch also may be placed forwardly of the edge 36a, but in a counterclockwise direction so that, when viewed as in FIG. 2, the notch would appear to be on the opposite side of the edge as is shown in phantom in the FIG.

While the exemplary embodiment is illustrated as including only two of the corners 29a weakened to the predetermined strength by notches 35a, the addition of more weakened corners may be used to increase the amount of predetermined torque to which the screw is tightened. On the other hand, the addition of another notch 43a (such as is shown in phantom in FIG. 2) adjacent the edge 36a, but on the other side of the corner, may be used to weaken the corner further thereby reducing the amount of predetermined torque to which the screw may be tightened.

In the manufacture of the screw 25a, its outer surface is darkened in a manner well known in the art by dipping the screw in a phosphate such as zinc phosphate which adheres to metal of the screw. Then the screw is dried and dipped in oil, the phosphate coating absorbs the oil to blacken the surface of the screw and, thereafter, the screw is spun to remove any excess oil. Once the oil is absorbed by the phosphate, it is virtually impossible to remove the oil without scraping away the phosphate. Advantageously, the blackening of the screw further helps to make it easier to see if the screw is tightened properly in the workpiece. This is because the deformation of the weakened corner portions 29a by the driver 30 exposes shiny burnished metal which provides a readily visible contrast with the blackened surface of the screw. Further visual evidence of proper tightening is provided by a slightly raised portion 44a (FIG. 2) extending upwardly from the center of the head 26a. Preferably, the raised portion is formed in the shape of numerals indicating the predetermined torque of the screw and also is shined by the driver 30 when the latter spins around the head as the screw is tightened in the workpiece to the predetermined torque.

Other forms of the present invention are shown in FIGS. 5 through 11, wherein screws 25b, 25c, 25d and 25e include heads 26b, 26c, 26d and 26e comprising bases 45b, 45c, 45d and 45e each integrally formed on the upper ends of threaded shanks 27b, 27c, 27d and 27e. Projections 46b, 46c, 46d and 46e extending upwardly from their respective bases are shaped for engagement by initial tightening tools (not shown) and include weakened portions 29b, 29c, 29d and 29e adapted to be folded or twisted by their respective tightening tool as the latter are turned to tighten their respective screws into the workpiece (not shown) associated with the screws.

More particularly, with respect to the form of the invention shown in FIGS. 5, 6 and 7, the base 45b includes six vertical sides 31b arranged to form a hexagon and a central depression 47b opening upwardly from the top of the base. Extending upwardly from the bottom of the depression is the projection 46b which is generally cylindrical in shape and includes two notches 35b formed diametrically of each other in the sides 48b of the projection. The notches begin at their lower ends just above a frusto-conical shaped lower end portion 49b of the projection and extend upwardly tapering inwardly generally toward the center of the projection so the notches are shaped generally as inverted pyramids. The weakened corner portions 29b extend outwardly from the sides of the projection in a generally radial direction from the central axis of the screw and are formed as an incident to the formation of the notches to contain about the same amount of material as would otherwise fill the notches. The strength of each of the corner portions, of course, depends upon the height and width of each and, therefore, controls the torque to which the screw may be tightened.

As with the previously described screw 25a, the exemplary screw 25b is tightened to its predetermined torque as the initial tighten tool folds the corner portions 29b into the notches 35b (see FIG. 7). In the instant embodiment, however, a conventional hexagonal driver (not shown) of a particular size may be used to tighten the screw initially as opposed to the double hexagonal driver 30 used with the screw 25a. But when loosening and retightening the screw 25b, a second hexagonal driver (not shown) which is larger than the size of the initial driver is required in order to fit around the base 45b.

Other forms of the invention similar to the form shown in FIGS. 5, 6 and 7 are shown in FIGS. 8 through 11 as having projections 46c, 46d and 46e of different shapes. In the FIG. 8 embodiment, four notches 35c and four weakened corner portions 29c are formed on the projection 46c, these portions also being adapted to be folded into their respective notches when the predetermined torque is reached as the screw 25c is threaded into a workpiece (not shown). The screw 25d of FIG. 9 includes a projection 46d in which two notches 35d are formed opposite each other to define the cross-sectional area of the upper end of the projection as having a rectangular shape.

A projection 46e having a still different shape is shown in the form of the invention illustrated in FIG. 10. In this embodiment, the projection is in the shape of a plate extending vertically edgewise from a circular base 45e which is connected integrally with the shank 27e. The circular base is shown in this screw as an alternative to the arrangements shown in FIGS. 5 through 9 should it be desirable to provide a screw which cannot be loosened or retightened indiscriminately with conventional drivers without some degree of difficulty. More particularly, with reference to the plate 46e, the latter is shaped generally as an inverted trapezoid whose upper opposite corners project outwardly beyond the opposite lower corners 49e of the plate and serve as the weakened portions 29e of the plate. As shown in FIG. 11, when the screw 25e is tightened in a workpiece by means of twisting against the upper corners of the plate, the upper corners are folded so the plate assumes an S-shaped configuration upon reaching the predetermined torque of the screw.

Another form of the invention is shown in FIGS. 12 and 13 and includes a screw 25f with a head 26f which is shaped generally as a hexagon having weakened corner portions 29f connecting adjacent side walls 31f together. Herein, the side walls are curved between the corner portions with the latter connecting the adjacent ends of the side walls together whereby the corner portions and the side walls combine to define a central depression 47f of predetermined depth opening upwardly from the head. More particularly, the side walls are each of a height equal to the depth of the depression and the corner portions are ears 29f projecting outwardly in a generally radial direction from the center of the head.

The ears 29f are identical to each other and thus only one of the ears will be described in detail. As shown in FIGS. 12, and 13, the ear extends vertically along the height of the side wall 31f and includes a leading wall 50f spaced parallel with and forwardly of a trailing wall 51f (see FIG. 12). Both the leading and trailing walls extend outwardly in a generally radial direction from the central axis of the screw and are connected to the adjacent ends of two of the side walls. A curved bottom wall 53f integrally connects between the leading and trailing walls and, at its inner end, the bottom wall is integrally formed with the head 26f, the bottom wall being curved convexly in a direction away from the head.

As in other embodiments of the invention, when the screw 25f is tightened to its predetermined torque in a workpiece (not shown), the corner portions or ears 29f are folded over along the side walls 31f of the head whereby the head 26f is deformed visibly so that it may be checked easily to see if the screw in fact is tightened properly. While the screw is described as having curved side walls 31f, it will be appreciated that the walls also could be formed in flat planes extending between the corners to enable a hexagonal-shaped driver (not shown) to be used to loosen and retighten the screw in the workpiece.

Still another form of the present invention is shown in FIGS. 14 and 15 wherein a screw 25g includes a hexagonal-shaped head 26g with a base 45g of predetermined thickness integrally connected with the upper end of a threaded shank 27g by means of an annular shoulder 34g. The latter is located between the base and the shank and includes an outer edge 54g which is spaced inwardly of the outer surfaces of six upright side walls 31g integrally formed around the periphery of the head to define a central depression 47g. While each of the weakened corner portions 29g may be provided by means of a hole (not shown) adjacent each of the corner portions, herein, a yieldable web 55g extends between weakened corner portions and the base to connect the portions with the base. The webs are less thick than the thickness of the base so that, when a tool (not shown) such as a double-hexagonal driver is used to tighten the screw, the corner portions collapse inwardly toward the center of the depresssion as the screw is tightened to its predetermined torque. Because the side walls are supported by the thicker base, the walls remain undamaged after the screw is tightened so that a single hexagonal driver (not shown) can be used to loosen and retighten the screw if such should become necessary. When tightening the screw with the double-hexagonal driver, the shoulder 34g holds the sides of the head above the surface of the workpiece (not shown) thus allowing the driver to fully engage the weakened corner portions 29g to tighten the screw properly to its predetermined torque. Although the embodiment is described and illustrated with the central depression 49g formed in the top of the head, it will be appreciated that the depression could be formed in the underside of the head as is also the case with the forms of the invention shown in FIGS. 16 through 20.

In still further forms of the invention as shown in FIGS. 16 through 20, other unique arrangements are employed to weaken the corner portions 29h and 29j of the heads 26h and 26j while still supporting the side walls 31h and 31j of the heads of the respective screws 25h and 25j so that the corner portions collapse inwardly as the screws are tightened in a workpiece (not shown) to the predetermined torque. The embodiment of FIGS. 16 and 17 employs a relatively thin base 34h with generally radial ribs 56h connected between the base and the side walls 31h to support the latter while leaving the corner portions 29h of the head relatively unsupported. Herein, the ribs are in the form of conic sections each extending outwardly from a vertex 57h at the center of the head, the base ends 59h of the sections being integrally formed with the side walls. The base ends of the sections are shorter in length than the lengths of the side walls and thus keep the latter from being bent when the corner portions are bent inwardly by a driver (not shown) as the screw is tightened to its predetermined torque. In addition, as in most of the other embodiments described herein, certain corners of the head may be rounded in a manner similar to the way in which the flats 33g of the embodiment disclosed in FIG. 1 are used to control the predetermined torque to which the screw may be tightened.

The form of the invention shown in FIGS. 18 and 19 provides a head 26j in which the thickness of the side walls 31j at the corner portions 29j is reduced substantially in comparison with the thickness of the side walls intermediate their ends. With this arrangement, the interior surface 60j of each of the side walls 31j is curved inwardly toward the center of the head between the opposite ends of the side wall so that the central portion of the side wall resists bending while still permitting the corner portions to be bent inwardly.

In a slightly different form of the invention shown in FIG. 20, two weakened corner portions 29k are used for tightening the screw 25k. The other corners are rounded by flats 33k extending between adjacent side walls 31k of the head 26k. As in the embodiment of FIGS. 18 and 19, the side walls are thicker between the weakened corner portions than at the weakened corner portions but, instead of curving inwardly, the interior surfaces of the side walls are curved outwardly.

In view of the foregoing, it will be appreciated that the novel screw 25 of the present invention is particularly suitable for use in production line assembly to provide a readily visible check assuring that the screw is tightened properly. This is accomplished by virtue of the use of unique weakened corner portions 29 on the head 26 of the screw whereby, as the screw is tightened to a predetermined torque, additional tightening torque readily deforms the corner portions causing the tightening tool 30 to slip around the head of the screw. The deformation of the corner portions serves as visual evidence that the screw in fact is tightened properly in the workpiece and can be seen quite readily enabling the checking to be completed quickly.

I claim as my invention:

1. A one-piece screw adapted to be threaded into a workpiece by a tool to a predetermined torque, said screw including an elongated threaded shank, a head integrally formed on one end of said shank and shaped for engagement by said tool, a weakened swageable portion of malleable material integrally formed with said head and having a predetermined strength correlated with said predetermined torque, a generally flat, external, tool-engaging face on said portion for abutting engagement by the tool to tighten the screw in the workpiece, and a recess within said head adjacent said portion to receive said portion and having a volume at least as great as the volume of said portion, said recess weakening said portion in torsion and said portion being swaged generally toward the central axis of said screw and into said recess without breaking loose from said head as the tightening torque applied to said portion exceeds said predetermined strength thereby providing visual evidence of tightening the screw in the workpiece to said predetermined torque and to cause the tool to slip in engagement with said weakened portion to prevent the screw from being tightened excessively in the workpiece.

2. A screw as defined by claim 1 being further adapted for loosening and retightening by a second tool wherein said head is generally polygonal in shape including a plurality of sides, said weakened portion forming a corner of said polygonal head, said recess comprising a notch formed in the side of said head adjacent said corner to weaken the latter to said predetermined strength and to receive said weakened corner portion as the latter is bent by said tool, said sides being adapted for engagement by said second tool to loosen and retighten said screw.

3. A screw as defined by claim 2 including a plurality of said weakened corner portions numbering less than the total number of corners forming the polygonal head, said head having a flat extending between adjacent sides to form at least one generally rounded corner permitting said first-mentioned tool to move relative thereto without substantially inhibiting the slipping of said first tool around said head after having threaded said screw into said workpiece to said predetermined torque, the number of said weakened corners plus the number of said rounded corners totaling the number of corners on said polygonal head.

4. A screw as defined by claim 3 wherein said head is generally hexagonal in shape and includes two weakened corners located generally diametrically of each other, said notches each extending generally vertically across the side of said head and having a generally U-shaped cross-sectional area.

5. A screw as defined by claim 4 having two of said notches adjacent each of said two weakened corners and each of said weakened corners being located between its two adjacent notches.

6. A screw as defined by claim 4 wherein the cross-sectional area of each of said notches is generally trapezoidal in shape having an inner wall extending generally parallel to the side of head within which the notch is formed, an end wall located adjacent said weakened corner portion and extending generally radially toward the central axis of said screw from said side and an opposite wall converging toward said end wall upon progressing inwardly from said side.

7. A screw as defined by claim 4 wherein said head includes an annular shoulder spaced inwardly of the sides of said head and forming the lower end of said head.

8. A screw as defined by claim 4 being formed of metal and having a darkened exterior finish to provide a visible contrast between the corner portions which are deformed and shined as a result of being bent by the tool.

9. A screw as defined by claim 8 including a raised portion extending from the top of said head for engagement with said tool to be shined thereby as the latter slips when said screw is tightened to its predetermined torque.

10. A screw as defined by claim 1 wherein said head includes a base integrally formed on said shank and a projection with sides extending from said base in an axial direction away from said shank, said projection being shaped for engagement by said tool and including said weakened portion.

11. A screw as defined by claim 10 including a corner formed on one side of said projection and defining said weakened portion, said recess comprising a notch formed in the side of said projection adjacent said corner to weaken the latter to said predetermined strength.

12. A screw as defined by claim 11 including at least two of said corners formed on said projection generally diametrically of each other and two of said notches, each of said notches slanting inwardly toward the central axis of said screw upon progressing upwardly through said projection from adjacent the base of said head.

13. A screw as defined by claim 12 including four of said corners and four of said notches, both said corners and said notches being spaced equiangularly from each other on the sides of said projection.

14. A screw as defined by claim 12 wherein each of said notches is shaped generally as an inverted pyramid.

15. A screw as defined by claim 12 whereby said notches cooperate to define the cross-sectional area of the upper end of said projection as having a generally rectangular shape.

16. A screw as defined by claim 10 wherein said projection is a plate extending generally vertically edgewise for engagement by said tool.

17. A screw as defined by claim 16 wherein said projection has a vertical cross-sectional shape generally as an inverted trapezoid whereby the upper opposite corners of said projection project beyond the lower corners of said projection and serve as two of said weakened portions.

18. A screw as defined by claim 10 being further adapted for loosening and retightening by a second tool wherein said base is generally polygonal in shape having a plurality of sides adapted for engagement by said second tool for loosening and retightening said screw.

19. A screw as defined by claim 1 wherein said head is generally polygonal in shape and includes a plurality of upright side walls defining a central depression opening upwardly from said head, a plurality of said weakened portions each being defined by a corner portion connecting the ends of adjacent side walls together.

20. A screw as defined by claim 19 wherein said depression is formed in said head to a predetermined depth, each of said side walls having opposite ends and being of a height equal to said predetermined depth and curved lengthwise with the ends of adjacent side walls spaced from each other, an outwardly projecting ear forming each of said corner portions and being connected between each of said adjacent ends for engagement with said tool.

21. A screw as defined by claim 20 wherein each of said ears includes a leading wall extending generally radially from the axis of said screw, a trailing wall spaced from said leading wall and extending generally parallel therewith, and a curved bottom wall connected between said leading and trailing walls.

22. A screw as defined by claim 19 wherein said head includes a base of predetermined thickness integrally connected to said side walls and defining the bottom of said depression, a plurality of yieldable webs each of thickness less than the predetermined thickness of said base, each one of corner portions being connected to said base by one of said webs and the latter collapsing as said tightening torque exceeds said predetermined torque to permit said corner portions to be bent.

23. A screw as defined by claim 22 wherein said base includes an annular shoulder connected to the upper end of said shank, spaced inwardly of said side walls and forming the lower end of said head.

24. A screw as defined by claim 19 wherein said head includes a base defining the bottom of said depression, a plurality of generally radial ribs extending upwardly from said base and connected to said side walls to support the latter so that said corner portions are weaker than said side walls.

25. A screw as defined by claim 24 wherein each of said ribs is shaped generally as a conic section having a vertex at the center of said base and a base end connected to and supporting one of said side walls, said base ends each being shorter than the lengths of their respective side walls so that said corner portions can bend while the side walls avoid bending as the tightening torque exceeds said predetermined torque.

26. A screw as defined by claim 25 wherein the number of weakened corner portions is less than the total number of corners forming said polygonal head, the latter including a flat extending between adjacent sides to form at least one generally rounded corner permitting said tool to slip relative to said head when said weakened corners are bent.

27. A screw as defined by claim 19 wherein said side walls are thicker than said corner portions to resist bending as said corner portions are bent.

28. A screw as defined by claim 27 wherein the interior surface of each of said side walls is curved inwardly toward the center of said head between the opposite ends of said side wall.

29. A screw as defined by claim 27 wherein the number of weakened corner portions is less than the total number of corners forming said polygonal head, the latter including a flat extending between adjacent sides to form at least one generally rounded corner between each two weakened corner portions, the interior surfaces of the side walls being curved outwardly away from the center of said head between each of said two weakened corner portions whereby said side walls between said corner portions are thicker than said corner portions.

30. A one-piece screw adapted to be threaded into a workpiece by a tool to a predetermined torque, said screw including an elongated threaded shank, a generally polygonal head integrally formed on one end of the shank, and having a plurality of sides, a plurality of swageable corner portions of malleable material integrally formed with said head and being of a predetermined strength correlated with said predetermined torque, each of said corner portions having an external generally flat face positioned for abutting engagement by said tool to tighten the screw in the workpiece, and a plurality of notches formed in said head with at least one notch being formed adjacent each of said corner portions and having a volume at least as great as the volume of said adjacent corner portion to weaken said corner portions to said predetermined strength so the corner portions are swaged generally toward the central axis of said screw and into said notches by said tool without breaking loose from said head as the tightening torque applied by the tool to said portions exceeds the predetermined torque so that the tool slips on said head relative to said portions.

31. A one-piece screw adapted to be threaded into a workpiece by a tool to a predetermined torque, said screw including an elongated threaded shank, a head having a base integrally formed on the upper end of said shank and a projection extending upwardly from said base, said projection shaped for engagement by said tool and including a swageable, weakened corner portion formed of a malleable material and being of a predetermined strength correlated with said predetermined torque, said weakened portion including a generally flat face positioned for engagement by said tool to tighten the screw in the workpiece, a recess formed in said head adjacent said weakened portion to receive said weakened portion and having a volume at least as great as the volume of said portion, said weakened portion being swaged in a generally circumferential direction, generally toward the central axis of said screw and into said recess by said tool without breaking loose from the head so the tool slips past said face and around said head as the tightening torque applied to the screw exceeds said predetermined torque.

32. A one-piece screw adapted to be threaded into a workpiece by a tool to a predetermined torque, said screw including an elongated threaded shank, a generally polygonal head integrally formed on one end of said shank and having a plurality of upright side walls defining a central depression opening upwardly from said head, a plurality of swageable corner portions formed of a malleable material and connecting the ends of adjacent side walls together in said polygonal shape, each of said corners being of a predetermined strength correlated with said predetermined torque and having generally flat, external face positioned for abutting engagement by said tool to tighten the screw in the workpiece, a recess adjacent each of said corner portions, having a volume at least as great as the volume of said adjacent corner portion and forming a part of said depression to weaken said corner portions, said corner portions being swaged generally toward the central axis of said screw and into said recesses by said tool without breaking loose from said head so the tool slips around said head as the tightening torque applied to said screw exceeds said predetermined torque.

33. A one-piece fastening element having a threaded portion adapted to mate with a threaded portion of another member to be tightened on said member to a predetermined torque by a tool, said element being shaped for engagement by said tool and having a swageable weakened portion formed of a malleable material and being of a predetermined strength correlated with said predetermined torque, said weakened portion including an external, generally flat, tool-engaging face for abutting engagement by said tool to tighten the element on the member, and a recess within said element adjacent said weakened portion to receive said portion and having a volume at least as great as the volume of said weakened portion, said recess weakening said portion in torsion to said predetermined strength, said portion being swaged generally toward the central axis of said element and into said recess without breaking loose from said head as the tightening torque applied to said portion exceeds said predetermined strength thereby providing visual evidence of tightening said element on said member to said predetermined torque and to cause the tool to slip in engagement with said weakened portion to prevent the element from being tightened excessively on the member.

34. An integral threaded malleable fastener having a threaded portion and a driving head limiting the initial torque of tightening said fastener, said head having a plurality of external flats about the axis of said threaded portion, at least one of said flats having a tool engaging face in the plane of said one flat and defining a continuation thereof extending beyond a circle about said axis circumscribing said flats, said circle intersecting said plane to define a swageable, permanently deformable portion outside said circle, and a recess formed within said head adjacent said tool engaging face and having a portion within said circle, said recess having a volume at least equal to the volume of said deformable portion and receiving said deformable portion as the latter is swaged inwardly of said tool engaging face whereby the torque of tightening said fastener is limited by the strength of said deformable portion.

35. The integral fastener defined in claim 34, characterized in that said fastener includes at least three-flats defining a regular polygon and said flats include two circumferentially spaced tool engaging faces, whereby said fastener may be threadedly removed by engaging said flats after permanent deformation of said deformable portions.

36. The integral metal fastener defined in claim 35, characterized in that said recesses are defined in the next adjacent flat, weakening said tool engaging faces.

37. The integral metal fastener defined in claim 36, characterized in that said fastener includes six flats and said threaded portion is a male threaded shank integral with said driving head.

* * * * *